J. Arndt,
Sharpening Reciprocating Saws.
N° 3,927.    Patented Feb. 24, 1845.
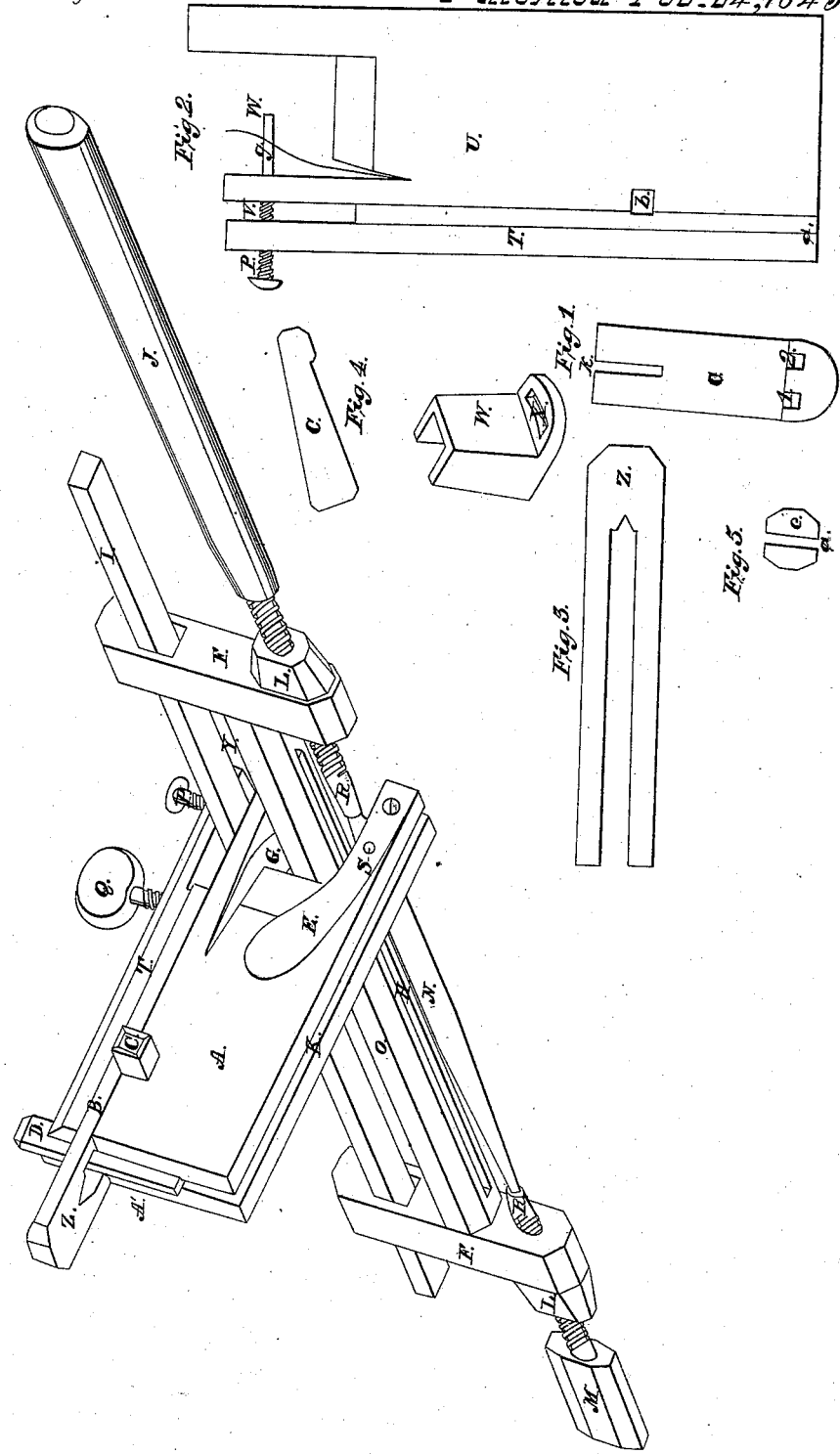

UNITED STATES PATENT OFFICE.

JACOB ARNDT, OF WHEELING, VIRGINIA.

MACHINE FOR FILING SAWS.

Specification of Letters Patent No. 3,927, dated February 24, 1845.

To all whom it may concern:

Be it known that I, JACOB ARNDT, of the city of Wheeling, Ohio county, Virginia, have invented a new and useful Machine for Filing Saws, and do hereby declare that the following is a full description and specification of the same, reference being had to the accompanying drawings, denominated "saw-filer," making a part of this specification.

Description of the construction and operation of J. Arndt's saw filer.

It consists of a block fixed over the teeth of the saw and a frame to hold and carry the saw in the operation of filing.

1. The body of the machine consists of a block marked A, with a groove in the under side K, in which the teeth of the saw will be placed for the purpose of being filed, as represented in the accompanying drawings. This block will be moved by the hand over the teeth of the saw as they shall one after another have been filed. On the side of the block A, a small thumb-spring E, is fixed with a pin S, reaching through into the groove K for the purpose of making pressure against the saw blade, and fixing it during the filing of each tooth. The block has a cap marked T, rounded at the top, on the under side of which before fastening it on the block, two square grooves are made, which when fitted on, form two square mortisses through the whole upper part of the block and shown at 1 and 2 in the end view of the block C, Figure 1. Out of the underside of the end Y of the cap of the block, a piece is cut, so as when put on, to form a mortise, as shown at V, Fig. 2. Below this is another mortise W, cut out of the end of the block for the file and frame to run in; and at the upper part of this mortise is fixed a spring g, for the purpose of pressing the file upon the saw during the operation of filing. Into the two grooves as represented by the end view Fig. 1, and at 1 and 2, a kind of double, or forked stick Z, Fig. 3, is made to run from the end A' in the perspective view to the pin P, and can be fixed in any required place by the wedge key C, Fig. 4, passed through the mortise b, Fig. 2, and lastly the main block has the slide D, and the screw Q passing down to the groove K, for the purpose of gauging or regulating the depth the saw teeth shall enter the groove K to enable the file to operate on them with the proper force.

2. The frame for carrying the file is constructed as follows: A straight bar marked O, a cross section of which is represented at c, Fig. 5. Through its center lengthwise, a slit or long mortise is cut as represented at d in the section Fig. 5, and marked H, in the perspective. To each end of this bar O, is fixed by a tenon and mortise in its middle a cross piece, or upright square bar, marked F. And through each of these, immediately below the bar O, a screw is inserted, running parallel with the bar O, one with the head marked M, the other screw extending from the frame and marked J, forms the handle by which the frame and file are worked. On the end of each screw is fixed a metallic point, marked R, the one on the handle with a round hole in the center, and the other with a three square or triangular hole in its center for holding the file N, which can be introduced, or taken away, or its different edges turned down upon the saw at any desired angle at pleasure by means of these screws, and when adjusted can be firmly secured in its place by the nuts L, so as to keep it in the same position during filing. Or instead of the nuts L, a piece of brass or other metal, such as represented at W, may be substituted to keep the screws R, which hold the file at the required angle for the slope of the saw teeth, and secured in their position by a screw passing through the circular mortise X, so that the operator can, by slackening the screw change the angle at pleasure. Above the bar O, and through the ends of the two cross pieces or upright bars F, on the ends of the bar O, are made two mortises at equal height or distance from the bar O. Then a straight bar marked I, passes through the mortises in the ends of the cross pieces, and has a hole in its center for the passage of the pin P. When thus made, its center is placed in the small mortise V, in the block A, with the spring g, placed above, or on the top of the bar O, and the pin P, passed down through a hole for that purpose through the two parts of the block A, the bar I, and the spring g into the mortise in the bar O. Thus arranged the frame carrying the file will with ease and accuracy be moved backward and forward by the handle J, the frame sliding on and guided by the bar I, with the same accuracy as the slides and tee-head jaws perform in directing the piston of a steam engine through the center of its cylinder, the bar I being stationary during the operation of filing, so as to enable a workman to perform the filing of a saw with mathematical accuracy both as to the slope of the teeth, and the slope of their face; for the slope of the face of the saw teeth can be adjusted to any required angle by slackening the key wedge C, Fig. 4, in the mortise $b$, Fig. 2, and moving the double or forked slide nearer to, or farther from the bar I, against the end of which the bar I, should rest during the operation of filing. Thus by the operation of the double slide, the face of the saw tooth can be made at a right angle, as is required for ripping boards, or at any other angle that the workman may require.

What I claim as my invention is—

The combination of the grooved block, which embraces the saw with the bar I, joined thereto in the middle, and the file frame which slides vertically and horizontally on the bar I, the said file frame being provided with a spring to bear the file on the saw as described in the foregoing specifications.

JACOB ARNDT.

Witnesses:
  LEWIS PERRINE,
  GEORGE P. HALL.